(12) United States Patent
Staffel et al.

(10) Patent No.: US 9,045,652 B2
(45) Date of Patent: Jun. 2, 2015

(54) USE OF A STABILIZER FOR PRODUCING HALOGEN-FREE, AMMONIUM POLYPHOSPHATE-CONTAINING FLAME-RETARDANT COATING COMPOSITIONS

(75) Inventors: Thomas Staffel, Grünstadt (DE); Jürgen Straub, Mannheim (DE); Michael Schmitt, Heidelberg (DE)

(73) Assignee: BK Giulini GMBH, Ludwigshafen (DE)

( * ) Notice: Subject to any disclaimer, the term of this patent is extended or adjusted under 35 U.S.C. 154(b) by 0 days.

(21) Appl. No.: 14/002,410

(22) PCT Filed: Feb. 29, 2012

(86) PCT No.: PCT/EP2012/000868
§ 371 (c)(1),
(2), (4) Date: Dec. 19, 2013

(87) PCT Pub. No.: WO2012/119717
PCT Pub. Date: Sep. 13, 2012

(65) Prior Publication Data
US 2014/0212588 A1     Jul. 31, 2014

(30) Foreign Application Priority Data
Mar. 5, 2011   (DE) .......................... 10 2011 013 222

(51) Int. Cl.
| | | |
|---|---|---|
| *C09K 21/04* | (2006.01) |
| *C09D 5/18* | (2006.01) |
| *B05D 1/00* | (2006.01) |
| *B05D 7/00* | (2006.01) |
| *C09D 7/12* | (2006.01) |
| *D06M 11/72* | (2006.01) |
| *D06M 15/263* | (2006.01) |
| *D06M 13/152* | (2006.01) |
| *D06M 15/227* | (2006.01) |
| *D06M 15/333* | (2006.01) |
| *D06M 15/564* | (2006.01) |

(52) U.S. Cl.
CPC ................ *C09D 5/18* (2013.01); *C09D 7/1233* (2013.01); *D06M 11/72* (2013.01); *D06M 15/263* (2013.01); *D06M 13/152* (2013.01); *D06M 15/227* (2013.01); *D06M 15/333* (2013.01); *D06M 15/564* (2013.01); *D06M 2200/30* (2013.01)

(58) Field of Classification Search
USPC ............... 106/14.12; 252/601, 607, 608, 610; 427/358, 385.5, 389, 389.9, 427.4, 427/427.6, 430.1, 438
See application file for complete search history.

(56) References Cited

U.S. PATENT DOCUMENTS

| 3,775,315 A | 11/1973 | Smith et al. |
| 5,212,272 A | 5/1993 | Sargent et al. |

FOREIGN PATENT DOCUMENTS

| DE | 69111105 T2 | 1/1996 |
| EP | 0449159 A2 | 10/1991 |

OTHER PUBLICATIONS

International Search Report issued in PCT/EP2012/000868, dated Jul. 2, 2012.

*Primary Examiner* — Anthony J Green
(74) *Attorney, Agent, or Firm* — Venable LLP; Keith G. Haddaway; Annette K. Kwok

(57) ABSTRACT

This invention relates to the use of a stabilizer which significantly enhances the compatibility of the binder (polymer dispersion) with the liquid ammonium polyphosphate, called APP for short, in a flame-retardant coating composition. In this flame-retardant coating composition, the liquid ammonium polyphosphate functions as active flame retardant. The flame-retardant coating compositions are highly suitable for all kinds of textiles, but also for paper, leather and fiber materials. The purpose of flame retardants is to retard the inflammation of combustible materials, such as plastics, textiles or wood, and to slow down or prevent entirely the spread of flame.

13 Claims, No Drawings

USE OF A STABILIZER FOR PRODUCING HALOGEN-FREE, AMMONIUM POLYPHOSPHATE-CONTAINING FLAME-RETARDANT COATING COMPOSITIONS

This application is a national stage of PCT International application No. PCT/EP2012/000868, filed Feb. 29, 2012, which claims priority to German Patent Application No. 10 2011 013 222.8, filed Mar. 5, 2011, the contents of which are each incorporated herein by reference in their entirety.

This invention relates to the use of a stabilizer which significantly enhances the compatibility of the binder (polymer dispersion) with the liquid ammonium polyphosphate, called APP for short, in a flame-retardant coating composition. In this flame-retardant composition, the liquid ammonium polyphosphate functions as active flame retardant. The flame-retardant coating compositions are highly suitable for all kinds of textiles, but also for paper, leather and fiber materials. The purpose of flame retardants is to retard the igniting of combustible materials, such as plastics, textiles or wood, and to slow down or prevent entirely the spreading of flames. The subject matter relates to different chemical compounds which can be used, for example, in the plastic casings used for televisions and computers, in textiles used in living spaces, and in foam materials used for the insulation and assembly.

The following types of flame-retardants are known from the prior art:
- halogenated flame retardants
- nitrogen-based flame retardants
- organophosphorus flame retardants
- inorganic flame retardants A frequently occurring phenomenon is the burning of textiles, e.g. in lodgings containing carpets, furniture or home textiles. However, clothing and especially that of firemen, children or also kitchen personnel is frequently subjected to the danger of fire. Textiles which must be flame retardant play an important role in many industrial processes. The flame-retarding properties of seat covers and upholstery, as well as floor coverings, furthermore represent an extremely important safety requirement for public transportation means.

Several options exist for attempting to extinguish a textile material already on fire in order to prevent a further spread of the fire, which can simply be extinguished with the aid of water, or sand, or also with the aid of a blanket, or by using so-called dry chemical extinguishers which frequently contain sodium hydrogen-carbonate under carbon dioxide pressure. In that case, the mechanism for extinguishing the fire involves the smothering of the flame through the liberation of carbon dioxide which is formed as a result of the thermal decomposition of the sodium hydrogen-carbonate. The flame-retarding effect of phosphor-containing flame retardants is primarily the result of forming a cover layer and the dehydration or elimination of water in the condensed phase. Intumescent paints which contain powdered ammonium polyphosphate primarily work by generating foam to insulate against heat. Compositions for flame-retardant coatings used on textiles or other materials are known from the prior art, as mentioned in the above. In addition to a halogen-containing active flame retardant, for example, they contain a binder. The binder as a rule is composed of an aqueous polymer dispersion, for example composed of the following polymers: polyurethane, poly-acrylate or vinyl chloride copolymers. As further components, these compositions contain auxiliary agents such as cross-linking agents, foam stabilizers, thickening agents and active flame-retarding agents, for example organic bromine and/or chlorine compounds. These agents are in part ecologically problematic, especially the bromine-containing flame retardants, which include poly-brominated diphenylether (PBDE), tetrabromo bisphenol A (TBBPA) and hexabromo cyclododecane (HBCD). They have long been used in the environment, but are difficult to break down and in part are also bio-accumulating, meaning they accumulate in living organisms. TBBPA and HBCD are toxic to organisms in the water. TBBPA and HBCD have already been detected in breast milk and in the blood of humans. TBBPA and HBCD are suspected of having long-term toxic effects. Several bills have been introduced to remove this agent from the market place.

The organophosphorus-containing flame retarding agents, typically aromatic and aliphatic esters of the phosphoric acid such as the ones listed below, are problematic with respect to the environment. Some of these agents are listed in the following.
- TCEP (tris(chlorethyl)phosphate)
- TDCPP (tris(dichlorisopropyl)phosphate)
- TPP (triphenyl phosphate)
- TEHP (tris-(2-ethylhexyl)phosphate)
- TKP (tricresyl phosphate)
- ITP ("isopropylated triphenyl phosphate") mono-, bis- and tris(isopropylphenyl)phosphates, having different degrees of isopropylation
- RDP (resorcinol-bis(diphenyl phosphate))
- BDP (bisphenol-A-bis(diphenyl phosphate))

These flame retardants are used, for example, with soft and hard polyurethane foam materials, for example in upholstered furniture, vehicle seats or building materials.

The known inorganic flame retardants, for example, include:
- Aluminum hydroxide ($Al(OH)_3$) which is the most widely used flame retardant worldwide (also called ATH for "aluminum trihydrate"). It has a cooling and gas-diluting effect as a result of the elimination of water, but must be added in large amounts (of up to 60%).
- Magnesium hydroxide ($Mg(OH)_2$), MDH, "magnesium dihydrate") is a mineral-based flame retardant with higher temperature resistance than ATH, but with the same effect.
- Ammonium sulfate (($NH_4)_2SO_4$) and ammonium phosphate (($NH_4)_3PO_4$) dilute the gas in the flame by eliminating ammonium ($NH_3$) which is converted to water and different nitrogen oxides during the combustion, thereby removing oxygen from the flame. At the same time, they cause a protective layer to form as a result of the sulfuric acid ($H_2SO_4$) and/or the phosphoric acid ($H_3PO_4$), wherein these can interrupt the radical chain reaction as one of their functions. The acids are furthermore not burnable, are strongly hygroscopic and have high boiling points. For that reason, they condensate in the cooler region of the flame and are precipitated out onto the material. As a result of dehydration or elimination of water, metaphosphoric and poly-phosphoric acids also form from the phosphoric acid, which have even higher boiling points.
- Red phosphorous forms a layer composed of phosphoric acid and poly-phosphoric acid on the surface, wherein this layer swells up (intumescence). The layer has an insulating effect and prevents oxygen from reaching the material. The phosphates formed in the process have the same properties as the ammonium polyphosphates resulting from the ammonium phosphate.
- Antimony trioxide ($Sb_2O_3$) only functions as a synergist in combination with halogenated flame retarding agents. In cases of fire, it has the disadvantage of a catalytic effect resulting in dioxin development.

Antimony pentoxide ($Sb_2O_5$) functions also as a synergist, similarly as the $Sb_2O_3$.

Zinc borates (see borates), among other things, have a cooling and gas diluting effect resulting from the elimination of water. Zinc compounds, however, can also have a synergic effect and can in part replace the more dangerous antimony trioxide.

Calcium hydroxide ($Ca(OH)_2$) was used during the Second World War as flame retarding agent for the wood in roof trusses. It initially binds carbon dioxide from the air as a result of the elimination of water and then changes to calcium carbonate ($CaCO_3$). As a protective coating, it makes access more difficult.

Also known as active flame retardants are ammonium polyphosphate solutions. Ammonium polyphosphate solutions are introduced in the DE 10 2008 021 027. These solutions are well suited for the aforementioned purpose, namely to provide all kinds of textiles with flame retarding properties. However, if these solutions are applied simply in the form of an aqueous solution to the textiles, they cannot penetrate deep enough into the fibers. In addition, if these textiles are treated with this solution, the textiles become very stiff and heavy, as well as blotchy and thus have reduced wearing ability. Over time and through repeated washings, the ammonium polyphosphate is washed out of the textile structures.

For the treatment of substrates, such as textiles, a suitable flame-retardant coating composition must therefore always be used which comprises, among other things, the binder (polymer dispersion) and a liquid ammonium polyphosphate. Different types of compounds are contained in the binders (polymer dispersions): The essential starting materials are synthetic monomers, a protective colloid and/or emulsifying agent, initiating agent. As a result of polymerization of the monomers, the respective binders take the form of polymer dispersions. These binders are responsible for the improved adhesion of the flame-retardant coating composition on substrates.

Binders (polymer dispersions) based on polyurethane, vinyl acetate, or poly acrylate, however, are incompatible with the liquid ammonium polyphosphate, which frequently leads to an irreversible coagulation and/or flocculation. This coagulation presumably occurs as a result of damage to the stabilizer system, consisting of protective colloid and emulsifying agent.

The object of the invention therefore was to find a possible solution for removing this incompatibility between the two components, namely the liquid ammonium polyphosphate and the binder (polymer dispersion).

Surprisingly, it was discovered that when using an alkyl benzene sulphonate, which is added to the binder (polymer dispersion), the phenomenon of coagulation and flocculation no longer occurs, that the polymer dispersions are easy to handle, and that the flame-retardant coating compositions produced therewith can be applied homogeneously and permanently to all substrates. The invention is specified in further detail.

The use of an alkyl benzene compound as binder stabilizer with the general formula: [R-benzene-$SO_3$]Me, wherein R=$C_3$ to $C_9$ branched or linear alkyl residue, Me=Na and/or K and/or $NH_4$ in halogen-free liquid ammonium polyphosphate containing flame-retardant coating compositions, characterized in that the alkyl benzene sulphonate compound represents the sodium and/or potassium and/or ammonium salt of the p-Cumol sulphonic acid which is present in the composition in amounts of 1:10 to 1:30, relative to the binder (polymer dispersion).

The ratio of binder (polymer dispersion) to liquid ammonium polyphosphate (APP) in the dispersion is 1.3:1 to 1:5.

The liquid ammonium polyphosphate (APP) can be obtained by mixing a polyphosphoric acid, having the composition ($H_{n+2}P_nO_{3n+1}$) with n=1 to 50 and a phosphate ion distribution of $P_1$ to $P_3$ of up to 20 weight % and $P_4$ to $P_{50}$ from 70 up to 90 weight % with an aqueous ammonium solution of 10 to 30 weight % and/or with ammonium gas up to a maximum of 60° C. until a pH value range of 6.5 to 7.5 is reached, by furthermore allowing the solution obtained in this way to cool to room temperature, so that a clear, liquid ammonium polyphosphate is obtained with the formula ($NH_4PO_3$)n, with n=1 to 50 and a solids content of up to 50 weight %, a pH value of 6.5 to 7.5 and a density of 1.1 to 1.3 g/ml and a P4 to P50 share of 60 to 90 weight %, preferably 70 to 80 weight %.

These compositions are applied to the substrate in an amount ranging from 10 to 500 g/m² through soaking, spraying on, submerging, impregnating and using a doctor blade.

These compounds are commercially available.

Within the framework of the present invention, liquid ammonium polyphosphate is understood to refer only to those compounds which were produced in the liquid form, meaning no solutions obtained by dissolving a powdered solid ammonium polyphosphate in water because powdered ammonium polyphosphates have a very low solubility in water which is only approximately 1%.

These alkyl benzene sulphonates stabilize the binder (polymer dispersion) to prevent coagulation in the flame-retardant coating compositions. The textile substrate treated with a composition of this type above all has an almost unchanged soft feel to it. This also entails good wearing characteristics for the articles of clothing produced from it and/or a good processing ability for the textiles, for example those used in the production of automobile covers or furniture covers. The invention in general relates to the finishing of all types of textiles, such as fabrics, crocheted or knitted fabrics, woven or nonwoven materials on the basis of natural fibers such as plant fibers, cellulose fibers, plant protein fibers, chemical pulp fibers, paper fibers, rubber fibers, and alginate fibers, as well as animal fibers in the form of wool and hair, leather and leather fibers, and also fibers on the basis of chemical fibers, polymerization fibers, poly condensation fibers and poly addition fibers. According to the invention, p-Cumol sulphonic acid in the form of its Na and/or K salts is particularly suitable for use as a stabilizer for the binder (polymer dispersion) in the flame-retardant coating compositions.

Formulations According to the Invention 1. 20 g polyurethane dispersion Hydran® HW 930 (binder)
   2 g Na Cumol sulphonate (stabilizer)
   20 g liquid ammonium polyphosphate (APP) according to the specification
   10 g de-ionized water
2. 20 g polyurethane dispersion Evafanol® HA-107 C (binder)
   2 g Na Cumol sulphonate (stabilizer)
   20 g liquid ammonium polyphosphate (APP) according to the specification
   10 g de-ionized water
3. 20 g acrylate dispersion Acronal® A 509 (binder)
   2 g Na Cumol sulphonate (stabilizer)
   20 g liquid ammonium polyphosphate (APP) according to the specification
   10 g di-ionized water 4. 20 g vinyl acetate ethylene dispersion Mowilith® LDM 1880 (binder)
   2 g Na Cumol sulphonate (stabilizer)
   20 g liquid ammonium polyphosphate (APP) according to the specification
   10 g de-ionized water

| | |
|---|---|
| Hydran ® HW 930 | company DIC |
| Evafanol ® HA-107 C | company Nicca Chemical Co. |
| Acronal ® A 509 (binder) | company BASF |
| Mowilith ® LDM 1880 | company Celanese |

The results of the laboratory tests are demonstrated in the following Tables 1 to 2.

EXPERIMENT 1

Uniform strips of cotton fabric were saturated with the different solutions and were subsequently dried. The dried strips were subjected to a strong gas flame with a temperature of more than 500° C. and were held for approximately 1 minute in the gas burner flame at approximately 450 to 600° C.

Impregnated Cotton Fabric
Size 2 cm×20 cm; Weight Approximately 180 g/m²

| | application amount | burning behavior | degree of destruction in the fabric |
|---|---|---|---|
| liquid ammonium polyphosphate | 60 g/m² dry | extinguished when removed from the flame | fabric is burned, but structure is intact |
| formulation 1 | 125 g/m² dry | extinguished when removed from the flame | fabric is burned, but structure intact |
| formulation 2 | 120 g/m² dry | extinguished when removed from the flame | fabric is burned, but structure intact |
| formulation 3 | 125 g/m² dry | extinguished when removed from the flame | fabric is burned, but structure intact |

EXPERIMENT 2

Impregnated Polyethylene Fabric; Size 3 cm×20 cm; Weight Approx. 365 g/m²

| | application amount | burning behavior | degree of destruction in the fabric |
|---|---|---|---|
| liquid ammonium polyphosphate | 130 g/m² dry | extinguished when removed from the flame | fabric has melted |
| formulation 1 | 220 g/m² dry | extinguished when removed from the flame | fabric has melted |
| formulation 2 | 220 g/m² dry | extinguished when removed from the flame | fabric has melted |
| formulation 3 | 230 g/m² dry | extinguished when removed from the flame | fabric has melted |

Summary of the Results

The problem of combining a liquid ammonium polyphosphate with a binder (polymer dispersion) to obtain flame-retarding properties, without risking damage to the binder in the form of coagulation, could be solved by adding Na Cumol sulphonate. The flame-retarding properties of the liquid ammonium polyphosphate are not detrimentally affected by this. The system consisting of liquid APP, binder and the stabilizer according to the invention, e.g. the Na Cumol sulphonate, can be worked well into the flame-retardant coating composition, and/or compositions of this type can be applied without problems and homogeneously to the substrate.

The invention claimed is:

1. A halogen-free flame-retardant coating composition comprising:
   a binder (polymer dispersion);
   a binder stabilizer comprising an alkyl benzene compound having the general formula: [R-benzene-SO$_3$]Me, wherein R=C$_3$ to C$_9$ branched or linear alkyl residue, and Me=Na, K, or NH$_4$; and
   a liquid ammonium polyphosphate (APP).

2. The composition according to claim 1, wherein a ratio of the binder (polymer dispersion) to the liquid ammonium polyphosphate (APP) is 1.3:1 to 1:5.

3. The composition according to claim 1, wherein the liquid ammonium polyphosphate (APP) is obtained by
   mixing a polyphosphoric acid, having a composition (H$_{n+2}$P$_n$O$_{3n+1}$), wherein n=1 to 50 and a phosphate ion distribution of P$_1$ to P$_3$ of up to 20 weight % and P$_4$ to P$_{50}$ from 70 up to 90 weight % with an aqueous ammonium solution of 10 to 30 weight % and/or with ammonium gas up to a maximum of 60° C. until a pH value range of 6.5 to 7.5 is reached, and
   cooling the solution mixture to room temperature, so that a clear, liquid ammonium polyphosphate is obtained with the formula (NH$_4$PO$_3$)$_n$, wherein n=1 to 50 and a solids content of up to 50 weight %, a pH value of 6.5 to 7.5 and a density of 1.1 to 1.3 g/ml and a P$_4$ to P$_{50}$ share of 60 to 90 weight %.

4. The composition according to claim 1, wherein the alkyl benzene compound is a sodium, potassium, and/or ammonium salt of p-Cumol sulphonic acid.

5. The composition according to claim 1, wherein the alkyl benzene compound is present in the composition in amounts of 1:10 to 1:30, relative to the binder (polymer dispersion).

6. The composition according to claim 4, wherein the alkyl benzene compound is present in the composition in amounts of 1:10 to 1:30, relative to the binder (polymer dispersion).

7. The composition according to claim 3, wherein the liquid ammonium polyphosphate (APP) has a P$_4$ to P$_{50}$ share of 70 to 80 weight %.

8. The composition according to claim 1, wherein the composition is free of solid ammonium polyphosphates.

9. The composition according to claim 1, wherein the liquid ammonium phosphate (APP) comprises a P$_4$ to P$_{50}$ share of 60 to 90 weight %.

10. The composition according to claim 1, wherein the liquid ammonium phosphate (APP) has a repeating unit (NH$_4$PO$_3$)$_n$, wherein n=1 to 50.

11. The composition according to claim 10, wherein the liquid ammonium phosphate (APP) comprises a P$_4$ to P$_{50}$ share of 60 to 90 weight %.

12. A method of treating a substrate with a halogen-free flame-retardant coating, comprising: applying the composition of claim 1 to the substrate in an amount ranging from 10 to 500 g/m².

13. The method according to claim 12, wherein the composition is applied by soaking, spraying on, submerging, impregnating or using a doctor blade.

* * * * *